US012718170B2

(12) United States Patent
Nguyen et al.

(10) Patent No.: US 12,718,170 B2
(45) Date of Patent: Aug. 25, 2026

(54) APPARATUSES, SYSTEMS, AND COMPUTER PROGRAM PRODUCTS FOR TRANSFORMATION AND MASS EXPORTATION OF ENTERPRISE INSIGHTS DATA SETS VIA AN ENTERPRISE INSIGHTS DATA EXPORT SYSTEM

(71) Applicant: Atlassian PTY Ltd, Sydney (AU)

(72) Inventors: Michael Minh Nguyen, Aliso Viejo, CA (US); David Guimbellot, Windermere, FL (US); Joshua Kelly, McKinney, TX (US); Melissa Hartsock, Durham, NH (US); Sanjaykumar Jadav, Georgetown, TX (US); Soundarya Palepu, Oak Point, TX (US); Nicholas Xavier Johnson, Austin, TX (US)

(73) Assignee: Atlassian Pty, Ltd., Sydney (AU)

( * ) Notice: Subject to any disclaimer, the term of this patent is extended or adjusted under 35 U.S.C. 154(b) by 46 days.

(21) Appl. No.: 19/005,456

(22) Filed: Dec. 30, 2024

(65) Prior Publication Data

US 2026/0187562 A1 Jul. 2, 2026

(51) Int. Cl.
*G06F 16/174* (2019.01)
*G06Q 10/0637* (2023.01)

(52) U.S. Cl.
CPC ..... *G06Q 10/0637* (2013.01); *G06F 16/1756* (2019.01)

(58) Field of Classification Search
CPC ........................ G06Q 10/0637; G06F 16/1756
See application file for complete search history.

(56) References Cited

U.S. PATENT DOCUMENTS 8,849,955 B2 * 9/2014 Prahlad .................. G06F 16/41 709/215
10,140,303 B1 * 11/2018 Patterson ............. G06F 16/164
2013/0073806 A1 * 3/2013 Xavier ............... G06F 11/3485 711/170
2015/0149584 A1 * 5/2015 Yochai ............... G06F 11/2074 709/217
2016/0077926 A1 * 3/2016 Mutalik ............. G06F 16/1844 711/162
2016/0226971 A1 * 8/2016 Barajas Gonzalez ........................ H04L 67/1095
2017/0262520 A1 * 9/2017 Mitkar ................. G06F 16/275
2017/0300561 A1 * 10/2017 Kannan .............. G06F 16/3344

(Continued)

*Primary Examiner* — Jorge A Casanova
(74) *Attorney, Agent, or Firm* — Alston & Bird LLP

(57) ABSTRACT

An enterprise insights data export apparatus configured to export an enterprise insights data set from an external software platform to an enterprise data warehouse, the enterprise insights data export apparatus configured to: access the enterprise insights data set from a selected enterprise tenant of the external software platform; generate a full transformed data export data set based on the enterprise insights data set; transmit the full transformed data export data set to the enterprise data warehouse at a predefined low-traffic time slot; generate a delta transformed data export data set based on the enterprise insights data set and on the full transformed data export data set; and transmit the delta transformed data export data set to the enterprise data warehouse at a delta time slot, wherein the delta time slot differs from the predefined low-traffic time slot.

20 Claims, 8 Drawing Sheets

(56) References Cited

U.S. PATENT DOCUMENTS

| | | | | |
|---|---|---|---|---|
| 2018/0246648 | A1* | 8/2018 | Venkat | G06F 11/1662 |
| 2018/0329800 | A1* | 11/2018 | Mcintyre | G06F 11/0748 |
| 2019/0028403 | A1* | 1/2019 | Moldvai | H04L 47/76 |
| 2019/0213123 | A1* | 7/2019 | Agarwal | G06F 3/0608 |
| 2023/0409448 | A1* | 12/2023 | Singhal | G06F 16/178 |
| 2023/0409535 | A1* | 12/2023 | Kashi Visvanathan | H04L 9/14 |
| 2024/0281413 | A1* | 8/2024 | Kashi Visvanathan | G06F 11/1417 |
| 2025/0061085 | A1* | 2/2025 | Khilko | G06F 16/1756 |
| 2025/0245105 | A1* | 7/2025 | Pandita | G06F 9/5094 |
| 2025/0265154 | A1* | 8/2025 | Eberlein | G06F 11/1415 |
| 2026/0037481 | A1* | 2/2026 | Kashi Visvanathan | G06F 16/128 |

* cited by examiner

APPARATUSES, SYSTEMS, AND COMPUTER PROGRAM PRODUCTS FOR TRANSFORMATION AND MASS EXPORTATION OF ENTERPRISE INSIGHTS DATA SETS VIA AN ENTERPRISE INSIGHTS DATA EXPORT SYSTEM

BACKGROUND

Analysis of enterprise insights data by machine learning models helps enterprise leaders make better decisions. New methods for transforming, optimizing, and exporting enterprise insights data for processing and analysis by machine learning models are needed. The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

In one aspect, an enterprise insights data export apparatus is configured to export an enterprise insights data set from an external software platform to an enterprise data warehouse, the enterprise insights data export apparatus comprising one or more processors and one or more memories storing instructions that are operable, when executed by the one or more processors, to cause the enterprise insights data export apparatus to: access the enterprise insights data set from a selected enterprise tenant of the external software platform; generate a full transformed data export data set based on the enterprise insights data set; transmit the full transformed data export data set to the enterprise data warehouse at a predefined low-traffic time slot; generate a delta transformed data export data set based on the enterprise insights data set and on a previous full transformed data export data set or a previous delta transformed data export data set; and transmit the delta transformed data export data set to the enterprise data warehouse at a delta time slot, wherein the delta time slot differs from the predefined low-traffic time slot.

The enterprise insights data export apparatus further includes where the full transformed data export data set is generated during a full export.

The enterprise insights data export apparatus further includes where the delta transformed data export data set is generated during a delta export.

The enterprise insights data export apparatus further includes where the enterprise insights data set is transformed to a flattened data structure.

The enterprise insights data export apparatus is further configured to: cause, in response to successful completion of transmission of the enterprise insights data set to the enterprise data warehouse, generation of an export success notification, wherein the export success notification comprises at least a location of the enterprise data warehouse where the enterprise insights data set is stored; and cause transmission, to a customer device associated with the selected enterprise tenant, of the export success notification.

The enterprise insights data export apparatus further includes where the enterprise data warehouse is configured to be directly accessible by a client device.

The enterprise insights data export apparatus further includes where the delta transformed data export data set comprises only enterprise insights data altered since a previous full export or a previous delta export.

The enterprise insights data export apparatus is further configured to: cause, prior to generating the delta transformed data export data set, generation of a delta transformed data export data set notification, wherein the delta transformed data export data set notification comprises an indication that the delta transformed data export data set is ready to be exported; and cause transmission, to a client device associated with the selected enterprise tenant, of the delta transformed data export data set notification.

In one aspect, a computer program product includes at least one non-transitory computer-readable storage medium having computer readable program code portions stored therein, the computer-readable program code portions configured to: access an enterprise insights data set from a selected enterprise tenant of an external software platform; generate a full transformed data export data set based on the enterprise insights data set; transmit the full transformed data export data set to an enterprise data warehouse at a predefined low-traffic time slot; generate a delta transformed data export data set based on the enterprise insights data set and on a previous full transformed data export data set or a previous delta transformed data export data set; and transmit the delta transformed data export data set to the enterprise data warehouse at a delta time slot, wherein the delta time slot differs from the predefined low-traffic time slot.

The computer program product further includes where the full transformed data export data set is generated during a full export.

The computer program product further includes where the delta transformed data export data set is generated during a delta export.

The computer program product further includes where the enterprise insights data set is transformed to a flattened data structure.

The computer program product further includes computer-readable program code portions configured to: cause, in response to successful completion of transmission of the enterprise insights data set to the enterprise data warehouse, generation of an export success notification, wherein the export success notification comprises at least a location of the enterprise data warehouse where the enterprise insights data set is stored; and cause transmission, to a customer device associated with the selected enterprise tenant, of the export success notification.

The computer program product further includes where the enterprise data warehouse is configured to be directly accessible by a client device.

The computer program product further includes where the delta transformed data export data set comprises only enterprise insights data altered since a previous full export or a previous delta export.

The computer program product further includes computer-readable program code portions configured to: cause, prior to generating the delta transformed data export data set, generation of a delta transformed data export data set notification, wherein the delta transformed data export data set notification comprises an indication that the delta transformed data export data set is ready to be exported; and cause transmission, to a client device associated with the selected enterprise tenant, of the delta transformed data export data set notification.

In one aspect, a computer-implemented method includes accessing an enterprise insights data set from a selected enterprise tenant of an external software platform; generating a full transformed data export data set based on the enterprise insights data set; transmitting the full transformed data export data set to an enterprise data warehouse at a predefined low-traffic time slot; generating a delta transformed data export data set based on the enterprise insights data set and on a previous full transformed data export data set or a previous delta transformed data export data set; and transmitting the delta transformed data export data set to the enterprise data warehouse at a delta time slot, wherein the delta time slot differs from the predefined low-traffic time slot.

The computer-implemented method further includes where the enterprise insights data set is transformed to a flattened data structure.

The computer-implemented method further includes causing, in response to successful completion of transmission of the enterprise insights data set to the enterprise data warehouse, generation of an export success notification, wherein the export success notification comprises at least a location of the enterprise data warehouse where the enterprise insights data set is stored; and causing transmission, to a customer device associated with the selected enterprise tenant, of the export success notification.

The computer-implemented method further includes causing, prior to generating the delta transformed data export data set, generation of a delta transformed data export data set notification, wherein the delta transformed data export data set notification comprises an indication that the delta transformed data export data set is ready to be exported; and causing transmission, to a client device associated with the selected enterprise tenant, of the delta transformed data export data set notification.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
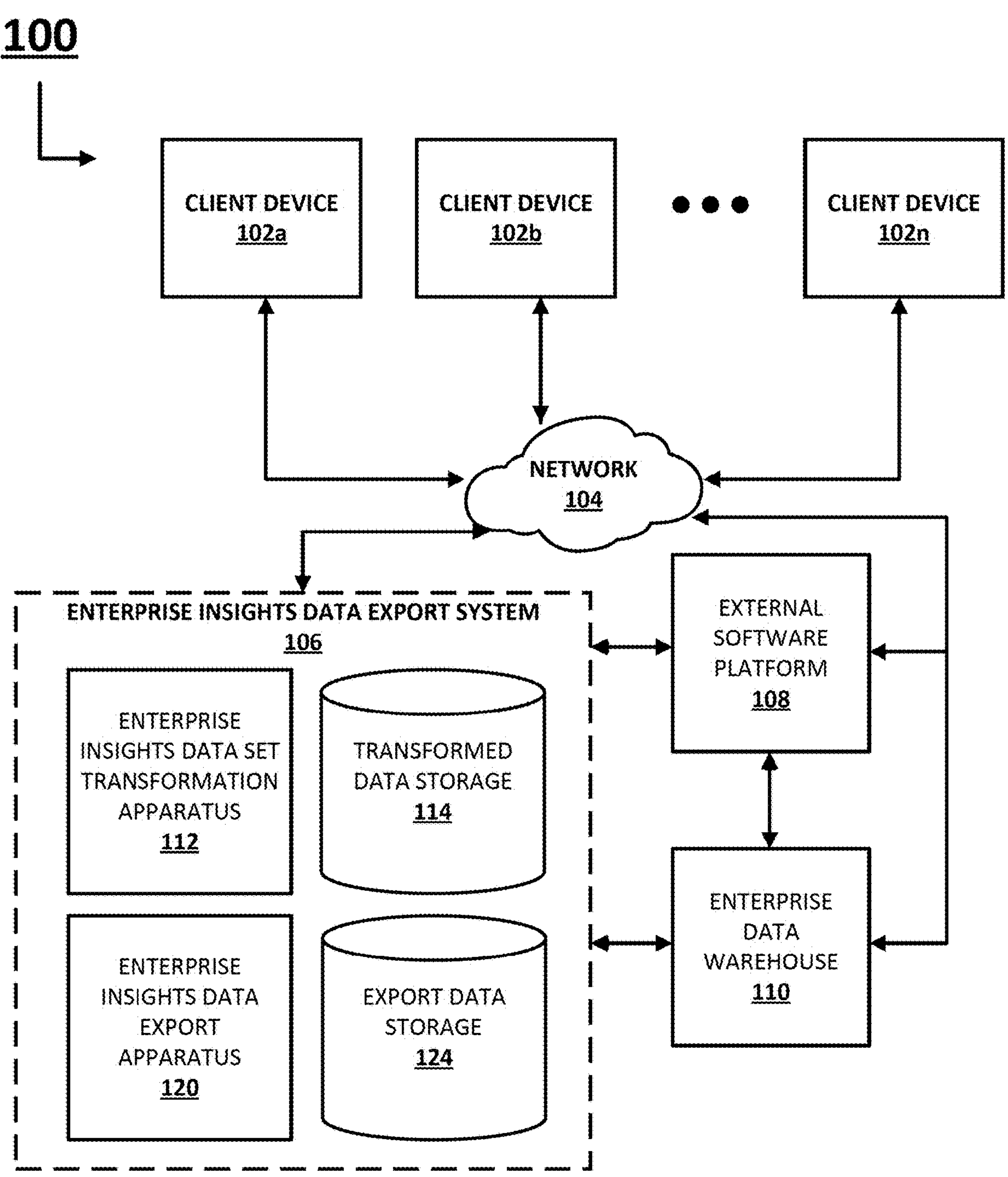
Figure 2:
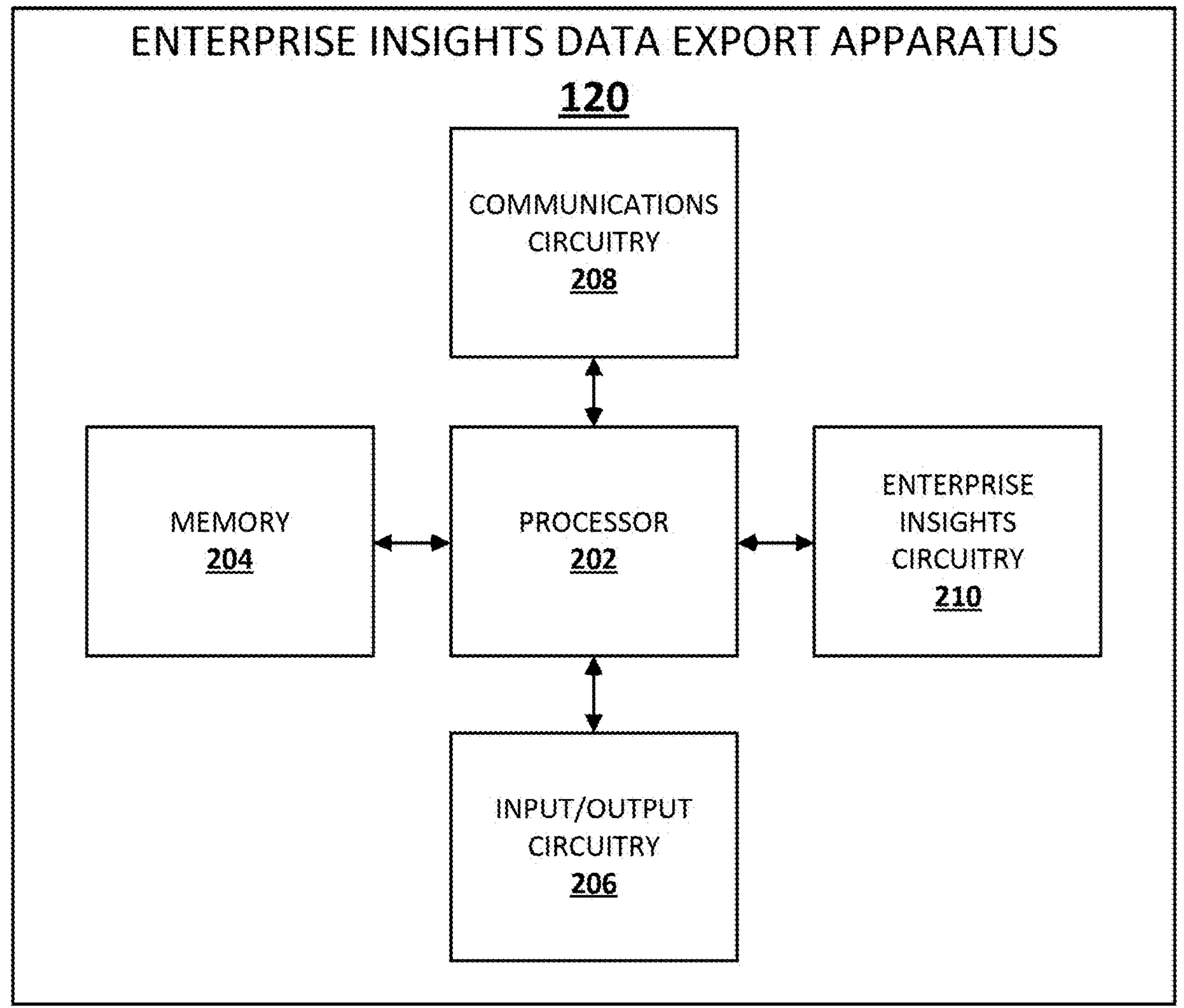
Figure 3:
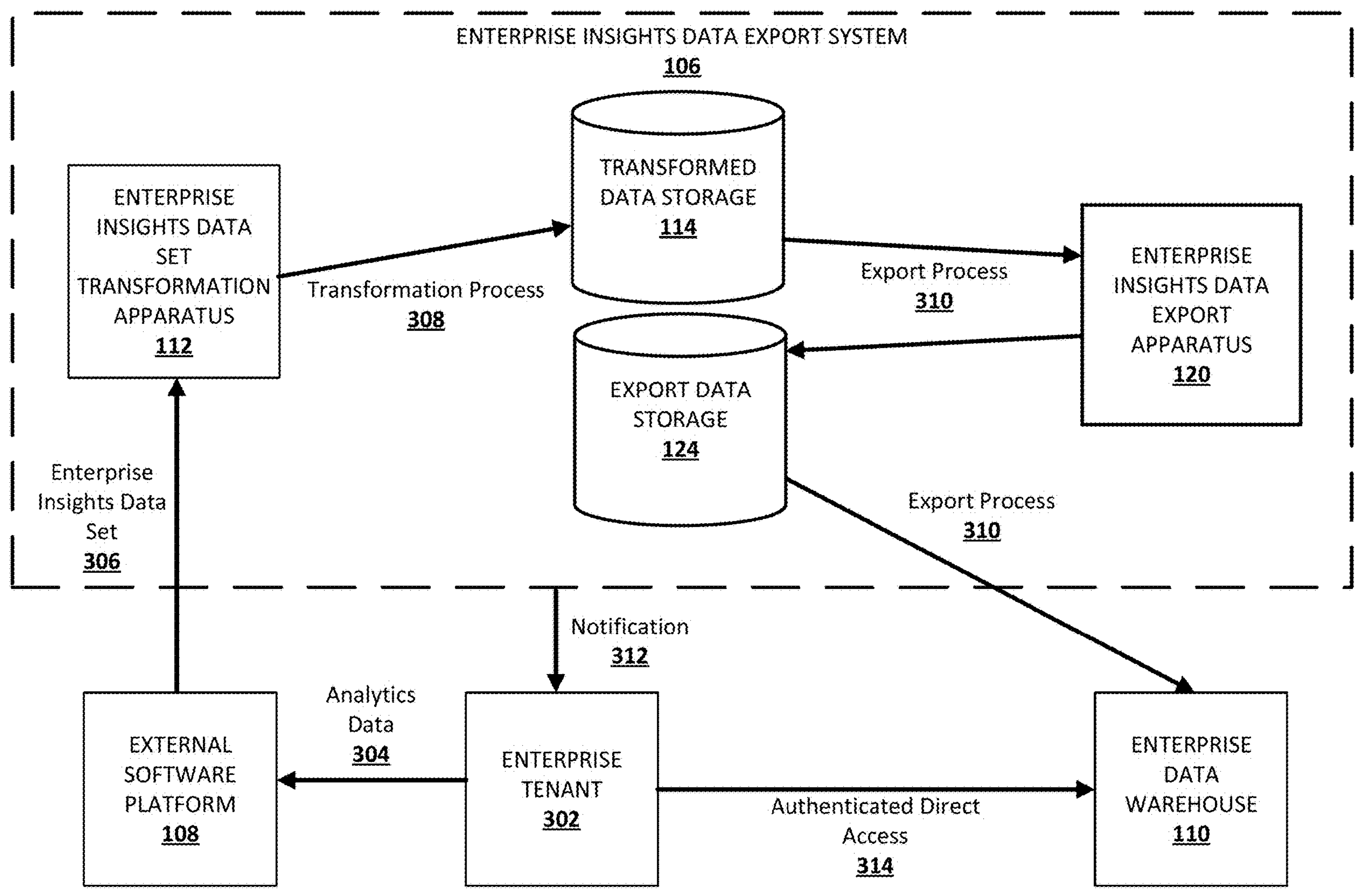
Figure 4:
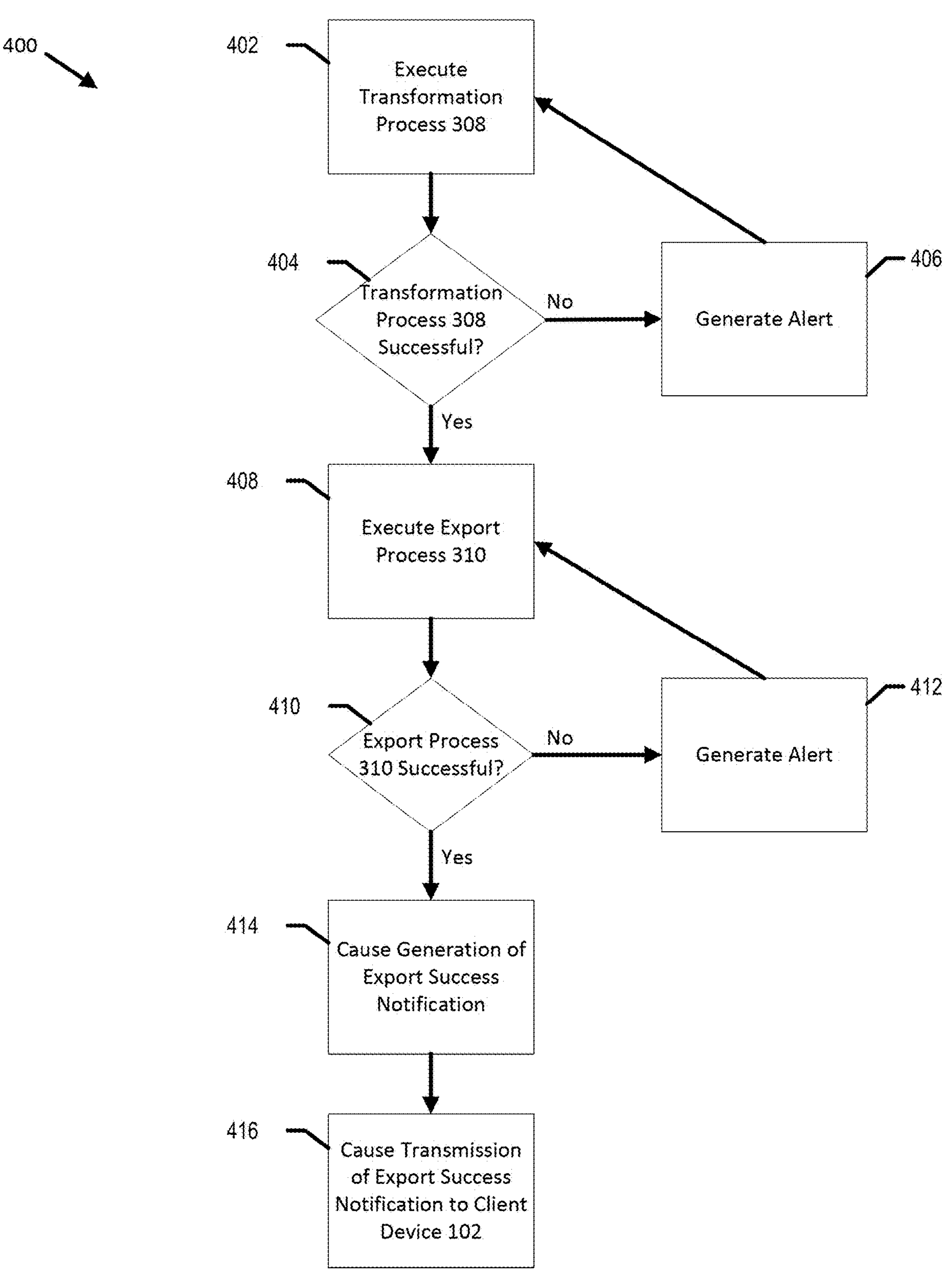
Figure 5:
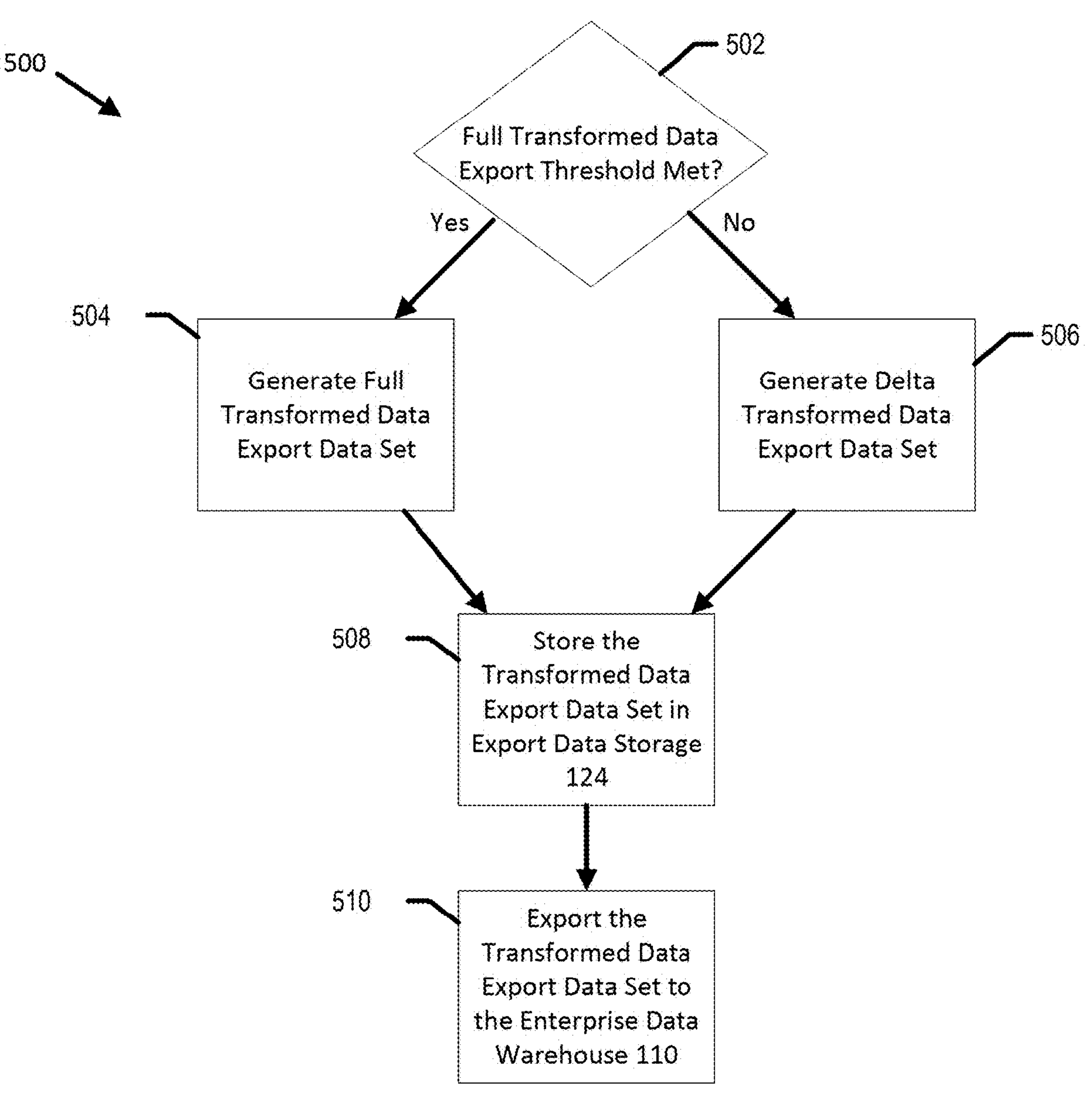
Figure 6:
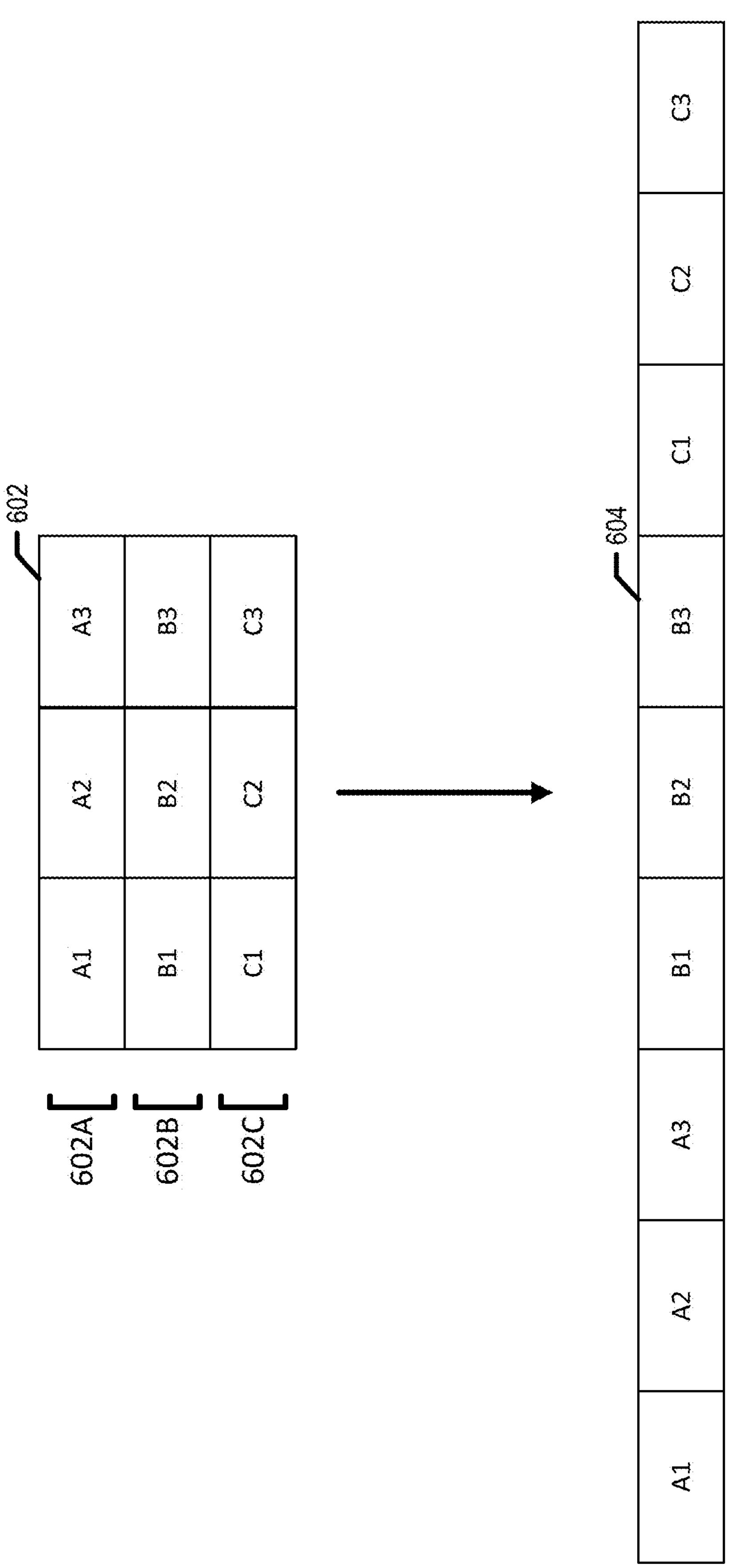
Figure 7:
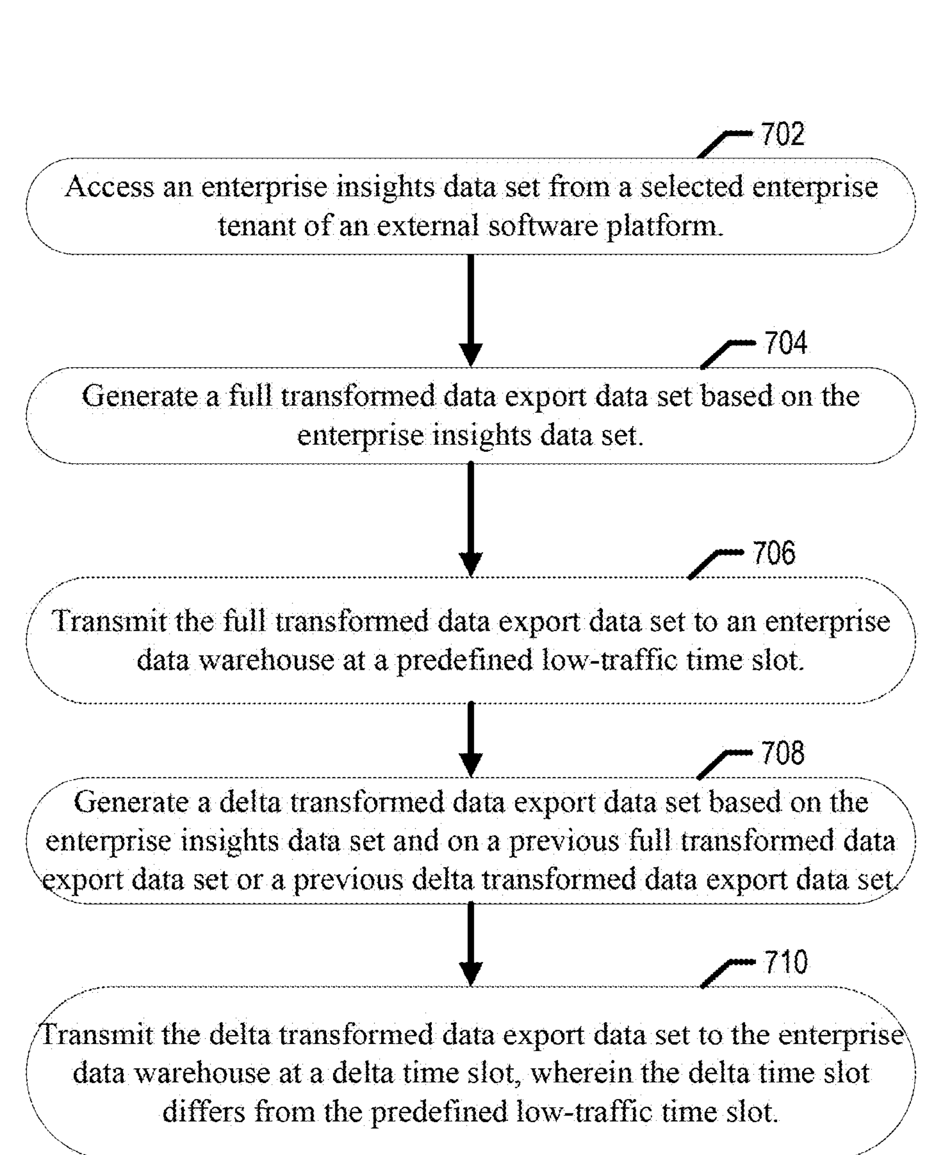
Figure 8:
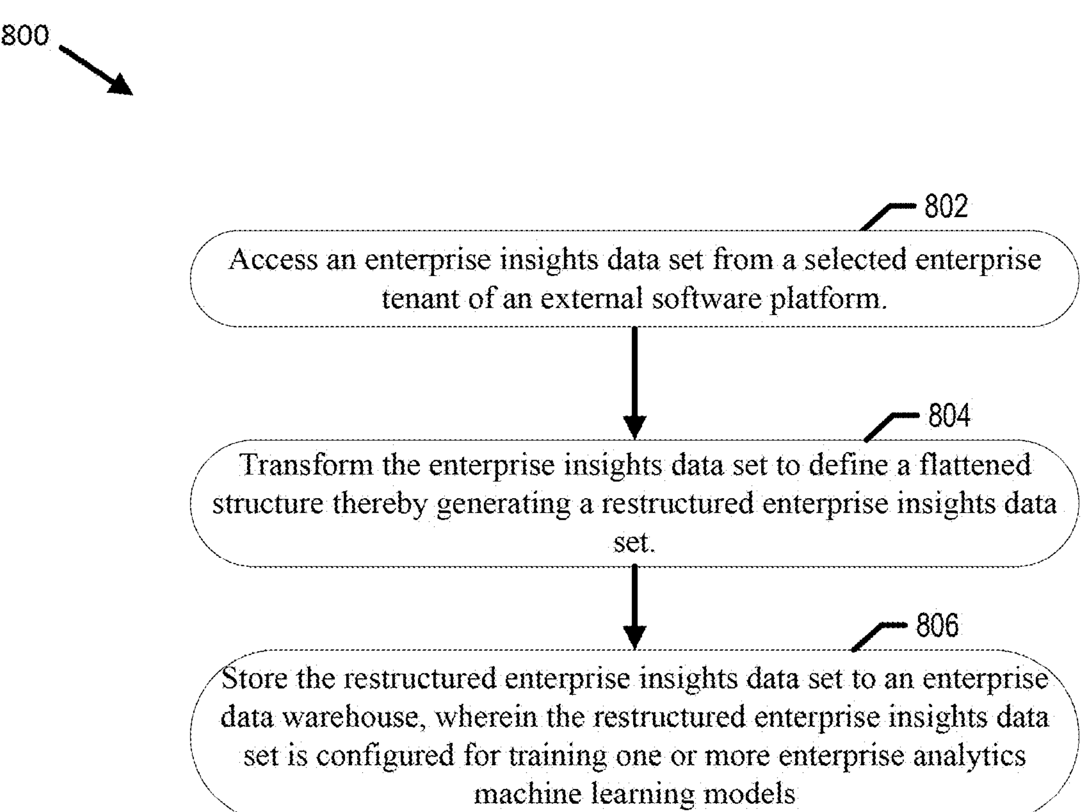

Having thus described certain example embodiments of the present disclosure in general terms, reference will now be made to the accompanying drawings, which are not necessarily drawn to scale, and wherein:

FIG. 1 illustrates a block diagram of an example system within which one or more embodiments of the present disclosure may operate;

FIG. 2 illustrates a block diagram of another example system within which one or more embodiments of the present disclosure may operate;

FIG. 3 illustrates an example data flow for an enterprise insights data export system in accordance with one or more embodiments of the present disclosure;

FIG. 4 illustrates a flowchart diagram of an example process for generating alerts for reporting failures during data transformation and export processes in accordance with one or more embodiments of the present disclosure;

FIG. 5 illustrates a flowchart diagram of an example process for performing full exports and delta exports in accordance with one or more embodiments of the present disclosure;

FIG. 6 illustrates an example transformation of an enterprise insights data set to a restructured enterprise insights data set in accordance with one or more embodiments of the present disclosure;

FIG. 7 illustrates a flowchart diagram of an example process for generating and exporting full transformed data export data sets and delta transformed data export data sets to an enterprise data warehouse in accordance with one or more embodiments of the present disclosure; and FIG. 8 illustrates a flowchart diagram of an example process for transforming an enterprise insights data set to a restructured enterprise insights data set and configuring the restructured enterprise insights data set to be used as training data for one or more enterprise analytics machine learning models in accordance with one or more embodiments of the present disclosure.

DETAILED DESCRIPTION

Overview

The present invention relates to systems and methods for exporting enterprise insights data from an external software platform to an enterprise data warehouse in a manner that addresses several technical challenges.

One key problem solved by the invention is enabling secure, efficient bulk export of enterprise project management data for customers who are unable to use standard database connectivity methods due to security policies. The invention provides an alternative export mechanism using data formats and cloud object storage, allowing customers to consume enterprise insights data in bulk without requiring direct access to databases within an external software platform.

The invention implements a novel two-tiered export approach, generating both full and delta transformed data export data sets. The full export provides a complete baseline dataset, while the delta export contains only data altered since the previous full export or previous delta export. This tiered approach solves the technical challenge of efficiently synchronizing large datasets by minimizing the amount of data transferred during routine updates. Full exports are typically performed at a predetermined low-traffic time slot and delta exports are typically performed at a predefined delta time slot. In one example, full exports are performed nightly and delta exports are performed hourly. This solution is particularly useful during operational failure or disaster recovery scenarios because enterprise customers will only need to apply a maximum of 23 delta exports to the most recent full export in order to reconstruct their full data set.

To optimize for analytics and machine learning use cases, the invention transforms the enterprise insights data into a flattened structure. This restructuring addresses the technical difficulty of efficiently querying and processing nested, hierarchical data typically found in project management systems. The flattened structure enables accelerated analytic querying and is optimized for training enterprise analytics machine learning models.

The invention also solves challenges related to data consistency and recovery. By including soft delete flags in the exported data, it provides a mechanism for customers to process deleted records in their data warehouses. This approach maintains referential integrity while allowing customers to track data lineage and historical changes.

To address scalability concerns, the invention implements intelligent partitioning of large datasets. When the enterprise insights data exceeds a predefined size threshold, the system automatically generates multiple transformed data sets, each with a unique identifier. This partitioning enables efficient parallel processing and management of extremely large datasets.

The invention further tackles the technical problem of coordinating data exports with customer systems by implementing flexible scheduling. Full exports are transmitted during predefined low-traffic time slots to minimize impact on system performance, while delta exports can be scheduled at system-defined intervals or customer-defined intervals to align with their specific data refresh requirements.

To enhance fault tolerance and error handling, the system generates notifications upon successful completion of data exports. These notifications include critical metadata such as storage locations, enabling automated workflows and reducing manual intervention in customer data pipelines. These notifications also include alerts for monitoring the invention to enable handling of any errors which may arise during the execution of the invention's many processes. In alternative embodiments, the system may cause notifications to be generated by an enterprise data warehouse.

By leveraging cloud object storage and a columnar file format, the invention provides a scalable, performant solution for exporting large volumes of enterprise data. The use of compression techniques like dictionary encoding, bit packing, and run length encoding further optimizes storage efficiency and query performance. In some embodiments, Parquet is used to transform data into a columnar format.

In summary, the present invention provides a comprehensive solution to the technical challenges associated with securely and efficiently exporting, transforming, and integrating large-scale enterprise insights data into customer data warehouses and analytics environments. It enables advanced analytics and machine learning use cases while addressing critical requirements around data consistency, scalability, and system integration.

Definitions

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

The term "enterprise insights data export system" refers to a system configured to export an enterprise insights data set from an external software platform to an enterprise data warehouse. The enterprise insights data export system comprises one or more processors and one or more memories storing instructions that, when executed, enable the apparatus to perform various data export operations.

The enterprise insights data export system is designed to address technical challenges associated with securely and efficiently exporting large volumes of enterprise project management data. It implements a novel two-tiered export approach, generating both full and delta transformed data export data sets. The full export provides a complete baseline dataset, while the delta export contains only data altered since the previous full export or a previous delta export. This tiered approach minimizes the amount of data transferred during routine updates, solving the technical challenge of efficiently synchronizing large datasets.

From a technical perspective, the system interfaces with external software platforms to access enterprise insights data from selected tenant instances. It then transforms this data into flattened data structures, which are optimized for analytics and machine learning use cases. The apparatus leverages cloud object storage, typically Amazon S3, to store and transmit the exported data sets. To enhance performance and reduce storage requirements, the system utilizes file formats which employ compression techniques such as dictionary encoding, bit packing, and run length encoding.

The enterprise insights data export system is primarily used by organizations that require bulk access to their enterprise project management data but are unable to use standard database connectivity methods due to security policies. It enables these customers to integrate their enterprise insights data into their own data warehouses and analytics environments without requiring direct access to databases within an external software platform. The system can be configured to transmit full exports during predefined low-traffic time slots and delta exports at delta time slots, allowing for flexible scheduling that aligns with specific data refresh requirements. In some embodiments, a delta time slot may be a customer defined time slot.

The term "enterprise insights data set" refers to a collection of enterprise business data generated by external software platforms that can be analyzed using enterprise analytics machine learning models to help enterprise leaders make better decisions. This data set encompasses a wide range of business intelligence information, such as enterprise project management data, derived from various enterprise activities and processes.

From a technical standpoint, the enterprise insights data set is typically stored in a structured or semi-structured format within the external software platform's database system. This could be a relational database management system (RDBMS) like Microsoft SQL Server, or a cloud-based database service such as Azure SQL Database. The data set may include multiple interconnected tables or documents, each representing different aspects of the enterprise's operations, projects, and performance metrics.

The enterprise insights data set serves as the primary source of data for the enterprise insights data export system. It is accessed and extracted from the external software platform, then transformed and exported to the customer's enterprise data warehouse. The data set may include both current and historical data, allowing for trend analysis and longitudinal studies of enterprise performance.

In terms of functionality, the enterprise insights data set provides a comprehensive view of an organization's operations, enabling data-driven decision making and strategic planning. It can be used to generate reports, dashboards, and predictive models that offer insights into various aspects of the business, such as project performance, resource allocation, financial metrics, and operational efficiency.

The term "external software platform" refers to software platforms including cloud platforms or other modern software platforms that are comprised of hundreds or even thousands of services and microservices. These platforms are external in that they are compiled on a separate code base from the enterprise insights data export engine that drives functionality of the enterprise insights data export system.

Technically, external software platforms are complex, distributed systems that leverage cloud computing technologies to provide scalable, flexible, and robust enterprise software solutions. They typically employ a microservices architecture, where different functionalities are implemented as independent, loosely coupled services that communicate via APIs. These platforms may use containerization technologies like Docker and orchestration tools like Kubernetes to manage and scale their services efficiently.

External software platforms often utilize a multi-tenant architecture, where a single instance of the software serves multiple customer organizations (tenants). This architecture requires sophisticated data isolation and security measures to ensure that each tenant's data remains private and secure. The platforms typically employ advanced authentication and authorization mechanisms, such as OAuth 2.0 or OpenID Connect, to manage access control.

In the context of the enterprise insights data export system, the external software platform serves as the source of the enterprise insights data set. The enterprise insights data export system interfaces with the platform's APIs or database systems to extract the required data. This interaction must be carefully managed to ensure data integrity, minimize performance impact on the platform, and adhere to security and compliance requirements.

The external software platform may also provide additional services that complement the data export process, such as data transformation capabilities, event notifications, or audit logging. These features can be leveraged by the enterprise insights data export system to enhance its functionality and integration capabilities.

The term "enterprise tenant of external software platform" refers to specific instances or configurations of an external software platform. Tenants may represent different teams, departments, or even separate organizations within a larger enterprise structure. Users require authentication and specific access credentials/permissions to access selected tenants.

From a technical perspective, an enterprise tenant is typically implemented as a logical partition within the external software platform's infrastructure. This partitioning is often achieved through database schemas, separate database instances, or containerized environments, depending on the platform's architecture. Each tenant has its own dedicated data storage, which may include databases, file systems, and caches, ensuring data isolation between different tenants.

Access control for enterprise tenants is managed through sophisticated identity and access management (IAM) systems. These systems use technologies such as SAML, OAuth, or OIDC for authentication and authorization. Role-based access control (RBAC) or attribute-based access control (ABAC) models are often employed to define fine-grained permissions within each tenant.

In the context of the enterprise insights data export system, the system must be capable of interfacing with multiple enterprise tenants, potentially across different external software platforms. It needs to handle the complexities of authenticating and authorizing access to each tenant, as well as managing the extraction and transformation of data from tenant-specific schemas or databases.

The enterprise tenant model allows for customization and configuration specific to each organization's needs, while still benefiting from the shared infrastructure and services of the external software platform. This approach enables efficient resource utilization and easier maintenance for the platform provider, while offering isolation and customization for individual enterprise customers.

The term "full transformed data export data set" refers to a complete set of enterprise insights data that are exported during low traffic time periods to reduce network expense. In one example, full transformed data export data sets are configured in a parquet file format.

From a technical standpoint, the full transformed data export data set represents a snapshot of the entire enterprise insights data set at a specific point in time. This data is transformed from its original format (which may be row-based in a relational database) into a columnar format, specifically the Apache Parquet format. Parquet is an open-source file format designed for efficient data storage and retrieval, particularly suited for big data processing frameworks like Apache Spark and Hadoop.

The transformation to a columnar format involves reorganizing the data so that each column of a table is stored contiguously, rather than each row. This structure offers several technical advantages:

1. Improved compression: Similar data is stored together, allowing for more efficient compression algorithms.
2. Reduced I/O: Queries that only access a subset of columns can skip reading unnecessary data.
3. Vectorized processing: Enables CPU-efficient data processing on modern hardware.

The full transformed data export data set is typically generated and transmitted during predefined low-traffic time slots to minimize impact on system performance. This process may involve:

1. Extracting data from the source system (external software platform).
2. Transforming the data into the Parquet format.
3. Applying data compression protocols.
4. Transmitting the data to the enterprise data warehouse (typically a cloud object storage system like Amazon S3).

The full transformed data export data set serves as a baseline for subsequent delta exports. It provides a complete snapshot of the data, which can be used for initial data warehouse population, data warehouse loads, or as a recovery point in case of synchronization issues. The use of the Parquet format makes this data set particularly well-suited for big data analytics and machine learning applications, as it allows for efficient querying and processing of large datasets.

The term "enterprise data warehouse" refers to a centralized repository for a given enterprise where large volumes of data are stored from various sources including structure, semi-structured, and unstructured formats. The enterprise data warehouse is used by an enterprise as a training corpus for enterprise analytics machine learning models and other business intelligence tools.

Technically, an enterprise data warehouse is implemented as a distributed storage system, often leveraging cloud-based object storage services such as Amazon S3, Azure Data Lake Storage, or Google Cloud Storage. These systems are designed to handle massive amounts of data (petabytes or even exabytes) with high durability, availability, and scalability.

In the context of the enterprise insights data export system, the enterprise data warehouse serves as the destination for the exported data sets. The full and delta transformed data export data sets are transmitted to and stored in the enterprise data warehouse, where they can be further processed, analyzed, and integrated with other data sources.

By storing the exported enterprise insights data in a data warehouse, organizations can leverage powerful analytics and machine learning tools to derive deeper insights from their data, potentially uncovering patterns and trends that were not visible in the original siloed data sources.

The term "delta transformed data export data set" refers to a 'deltas only' set of enterprise insights data that is exported during enterprise defined time slots. Such enterprise defined time slots are more flexibly assigned and generally different from the low-traffic time slots designated for transmitting the full transformed data export data set. In one example, delta transformed data export data sets are configured in a parquet file format.

From a technical perspective, the delta transformed data export data set represents the incremental changes to the enterprise insights data since the last full export or the previous delta export. This approach significantly reduces the amount of data that needs to be transferred and processed during routine updates, addressing the technical challenge of efficiently synchronizing large datasets.

The generation of a delta transformed data export data set involves several technical steps:

1. Change Data Capture (CDC): The system must identify which data has changed since the last export. This can be implemented using various techniques such as timestamp-based detection, log-based CDC, or trigger-based CDC.
2. Data Extraction: Only the changed data is extracted from the source system.
3. Transformation: The delta data is transformed into the columnar Parquet format, maintaining consistency with the full export format.
4. Metadata Management: Each delta export includes metadata about its contents and the time range it covers, enabling the receiving system to apply the changes correctly.
5. Compression: Like the full export, delta exports are typically compressed to reduce storage and transmission costs.

The delta transformed data export data set is designed to be applied sequentially to the previous full export or the previous delta export in the customer's data lake or data warehouse. This process, often referred to as "delta processing" or "incremental updates," allows for efficient data synchronization without the need to retransmit unchanged data.

The flexibility in scheduling delta exports allows enterprises to align the data refresh process with their specific operational needs and data freshness requirements. For example, a company might schedule delta exports every hour during business hours to ensure near-real-time data availability for operational analytics. Additionally, a company may trigger an immediate delta export by initiating a request to the enterprise insights data export system.

The use of delta exports in conjunction with full exports provides a robust and efficient mechanism for keeping enterprise data warehouses up-to-date with the latest data from external software platforms, enabling timely analytics and decision-making based on current information.

The term "enterprise insights data set transformation apparatus" refers to an apparatus configured to transform an enterprise insights data set into a restructured enterprise insights data set. This apparatus is designed to address the technical challenges associated with preparing enterprise data for advanced analytics and machine learning applications.

From a technical standpoint, the enterprise insights data set transformation apparatus is typically implemented as a distributed computing system, leveraging technologies such as Apache Spark or cloud-based data processing services like AWS Glue or Azure Data Factory. These technologies enable the apparatus to handle large-scale data transformations efficiently and in parallel.

The transformation process involves several key technical components:

1. Data Extraction: The apparatus interfaces with the source systems (e.g., external software platforms) to extract the raw enterprise insights data. This may involve API calls, database queries, or reading from file systems.
2. Schema Analysis: The system analyzes the structure of the input data, identifying nested and hierarchical relationships.
3. Flattening Algorithm: A core component of the apparatus is an algorithm that transforms nested and hierarchical data structures into a flattened structure. This may involve techniques such as denormalization, pivot operations, or custom flattening logic.
4. Data Type Conversion: The apparatus may need to convert data types to ensure compatibility with the target columnar format (e.g., Parquet).
5. Metadata Generation: As part of the transformation, the system generates metadata that describes the structure of the transformed data, including column names, data types, and any relevant statistics.
6. Optimization: The transformed data may be optimized for query performance, for example by reordering columns based on expected query patterns.
7. Compression: The apparatus applies compression techniques suitable for columnar data, such as dictionary encoding or run-length encoding.

The primary function of the enterprise insights data set transformation apparatus is to prepare enterprise data for efficient analysis and machine learning applications. By transforming complex, nested data structures into a flattened structure, it addresses several technical challenges:

1. Query Performance: The flattened structure allows for more efficient querying, especially for analytics workloads that typically access a subset of columns.
2. Machine Learning Readiness: Many machine learning algorithms work best with tabular data. The flattened structure is more directly usable for these applications.
3. Storage Efficiency: Columnar formats often achieve better compression ratios, reducing storage costs.
4. Scalability: The transformed data is more easily partitionable, enabling better distribution of processing workloads.

By providing a systematic way to transform complex enterprise data into a format optimized for analytics and machine learning, this apparatus plays a crucial role in enabling organizations to derive maximum value from their enterprise insights data.

The term "restructured enterprise insights data set" refers to a flattened, non-hierarchical or non-nested data structure that is created from an enterprise insights data structure that is configured for efficient training or other processing by enterprise analytics machine learning models and other business intelligence tools.

From a technical perspective, the restructured enterprise insights data set represents a transformed version of the original enterprise insights data, optimized for analytical processing and machine learning applications. The restructured enterprise insights data set is typically implemented using big data technologies such as Apache Hadoop, Apache Spark, or cloud-based data lake solutions like Amazon S3 with AWS Athena or Azure Data Lake Storage with Azure Synapse Analytics. These technologies provide the scalability and performance required to handle large volumes of restructured data efficiently.

The terms "machine learning module," "machine learning model," "ML module(s)," or "ML model(s)" refer to a machine learning or deep learning task or mechanism. The term "machine learning" refers to a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

The machine learning models as described herein may make use of multiple ML engines (e.g., for analysis, transformation, and other needs). The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

The ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or auto-encoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

The term "enterprise analytics machine learning models" refers to machine learning models and other artificial intelligence tools that are configured to analyze enterprise data within an enterprise data warehouse to help an enterprise make better decisions or otherwise improve operational efficiency.

From a technical perspective, enterprise analytics machine learning models encompass a wide range of algorithms and techniques designed to extract insights, make predictions, and automate decision-making processes based on large-scale enterprise data. These models are typically implemented using advanced machine learning frameworks and libraries such as TensorFlow, PyTorch, scikit-learn, or cloud-based machine learning services like Amazon SageMaker, Google Cloud AI Platform, or Azure Machine Learning.

Enterprise analytics machine learning models are typically designed to operate on the restructured enterprise insights data set within the enterprise data warehouse. They leverage the optimized, flattened format of this data to efficiently process large volumes of information and extract meaningful patterns and insights.

An enterprise analytics machine learning model is initially fit or trained on a training dataset (e.g., a set of examples used to fit the parameters of the model). The enterprise analytics machine learning model may be trained on the training dataset using supervised or unsupervised learning. The enterprise analytics machine learning model is run with the training dataset and produces a result, which is then compared with a target, for each input vector in the training dataset.

Based on the result of the comparison and the specific learning algorithm being used, the parameters of the enterprise analytics machine learning model are adjusted.

By leveraging the power of machine learning and artificial intelligence, enterprise analytics machine learning models enable organizations to extract maximum value from their data assets, driving innovation, efficiency, and competitive advantage in an increasingly data-driven business landscape.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

The terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and/or the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "repository" refers to a database, a datastore, and/or a memory device which is accessible by one or more computing devices for retrieval and storage of one or more data components, the like, or combinations thereof. The repository may be configured to organize data components stored therein in accordance with one or more particular data classification labels or other attributes attributed to the data component (e.g., a scoring metric, file size, file type, etc.). For example, a repository may be structured in accordance with one or more data components associated with one or more services, applications, data classification labels, internal resources, external resources, network functions, APIs, the like, or combinations thereof. In some embodiments, a repository may be at least partially stored on one or more of a server, remotely accessible by a computing device, or on a memory device on-board the computing device.

Exemplary System Architectures and Apparatuses

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server, cloud platform, or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a PDA, mobile telephone, smartphone, laptop computer, tablet computer, wearable, the like or any combination of the aforementioned devices.

FIG. 1 illustrates an example system architecture 100 within which embodiments of the present disclosure may operate. The system architecture 100 includes an enterprise insights data export system 106 configured to interact with an external software platform 108, an enterprise data warehouse 110, and one or more client devices 102A-102N. The depicted enterprise insights data export system 106 comprises an enterprise insights data set transformation apparatus 112, an enterprise insights data export apparatus 120, export data storage 124 and transformed data storage 114 as shown.

In the depicted embodiment, each of the one or more client devices 102A-102N is associated with a respective enterprise tenant of the external software platform 108 and is configured to communicate with external software platform 108 via a network 104.

In the depicted embodiment, components of system architecture 100 utilizes a data repository configured to store one or more data objects and/or data for one or more component objects associated therewith. In the depicted embodiment, the one or more data objects stored in the data repository include and/or are stored with data sent to and/or received from the one or more components of system architecture 100. The data repository may include one or more storage units, such as multiple distributed storage units that are connected through a computer network. Each storage unit in the data repository may store one or more data objects. Moreover, each storage unit in the data repository may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

Components of system architecture 100 may each be associated with computing devices configured to send and/or receive data directly or via a computer network, such as network 104. The enterprise insights data export system 106, the external software platform 108, the enterprise data warehouse 110, and/or the one or more devices associated therewith may be in communication using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

The invention disclosed herein may be embodied by one or more computing systems, such the enterprise insights data export apparatus 120 illustrated in more detail in FIG. 2. In one or more embodiments, the apparatus depicted in FIG. 2 may also depict an enterprise insights data set transformation apparatus 112. In one or more embodiments, the enterprise insights data export apparatus 120 may include processor 202, memory 204, input/output circuitry 206, communications circuitry 208, and/or enterprise insights circuitry 210. The enterprise insights data export apparatus 120 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the techniques and/or operations described herein when the instructions are executed.

In some embodiments, the enterprise insights data export apparatus 120 may include input/output circuitry 206 that may, in turn, be in communication with processor 202 to provide output to the user and, in some embodiments, to receive an indication of a user input. In some embodiments, the input/output circuitry 206 may be configured to render a user interface. Additionally or alternatively, the input/output circuitry 206 may be configured to render and/or control a display, and may comprise a web user interface, a mobile application, a query-initiating computing device, a kiosk, or the like. In some embodiments, the input/output circuitry 206 may be communicatively coupled to and/or include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the enterprise insights data export system 106. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

In some embodiments, the communications circuitry 208 may act as an intermediary for one or more components of the system architecture 100. For example, the communications circuitry 208 may receive and process requests, call, messages, and/or the like for one or more components of the system architecture 100. In some embodiments, the communications circuitry 208 may additionally or alternatively support data routing, traffic control, security, decryption, encryption, optimization, and/or the like for data associated with one or more components of system architecture 100. For example, the communications circuitry 208 may receive a data object and perform one or more subsequent actions based on the data object. In some embodiments, the communications circuitry 208 may provide functionality of a service proxy for one or more components of the system architecture 100. In some embodiments, the communications circuitry 208 may also be configured to generate access logs and/or historical data including information associated with a particular computing device, component, component object, the like, or combinations thereof.

The enterprise insights circuitry 210 may be any means such as a device or circuitry embodied in either hardware or a combination of hardware and software that is configured to interact with the system architecture 100 and/or the one or more components of the system architecture 100. For example, the enterprise insights circuitry 210 may be any means such as a device or circuitry embodied in either hardware or a combination of hardware and software that is configured to interact with the enterprise insights data export system 106, the external software platform 108, the enterprise data warehouse 110, and/or the one or more client devices 102A-102N.

In some embodiments, one or more external systems (such as a remote cloud computing and/or data storage system) may also be leveraged to provide at least some of the functionality discussed herein.

It should be readily appreciated that the embodiments of the systems and apparatuses, described herein may be configured in various additional and alternative manners in addition to those expressly described herein.

Exemplary Methods

FIG. 3 illustrates an example data flow for an enterprise insights data export system 106 in accordance with one or more embodiments of the present disclosure. The data flow depicts functionality between various subsystems of the present disclosure, including enterprise insights data export system 106, external software platform 108, enterprise data warehouse 110, and an enterprise tenant 302 of external software platform 108. Enterprise tenant 302 may be associated with a client device 102 (shown in FIG. 1 but represented in FIG. 3 as part of enterprise tenant 302) configured to directly access enterprise data warehouse 110 and communicate with external software platform 108.

In the depicted embodiment, external software platform 108 collects analytics data 304 from enterprise tenant 302. The analytics data 304 is any data relevant to the generation of enterprise insights data set 306 by external software platform 108. Enterprise insights data set 306 is any collection of enterprise business data, project management data, and/or the like generated by external software platform 108 or collected from enterprise tenant 302. Enterprise insights data set 306 is configured to be analyzed by enterprise analytics machine learning models to enable enterprise leaders to make better decisions based on their enterprise business data and analytics data 304. Enterprise analytics machine learning models may reveal data patterns or trends not otherwise derivable from raw, unstructured data.

In various embodiments, enterprise insights data set 306 may encompass a wide range of business intelligence information derived from various enterprise activities and processes. Enterprise insights data set 306 may be stored in a structured or semi-structured format within the external software platform's 108 database system. However, some enterprises have security policies which prevent enterprise tenant 302 from being able to access enterprise insights data set 306 directly from the external software platform 108.

To solve this technical challenge, enterprise insights data export system 106 utilizes enterprise insights data set transformation apparatus 112, enterprise insights data export apparatus 120, transformation process 308, transformed data storage 114, export data storage 124, export process 310, and notification 312 to enable enterprise tenant 302 to have authenticated direct access 314 to an enterprise data warehouse 110. The enterprise data warehouse 110 is configured to store an improved, transformed version of enterprise insights data set 306 and enable enterprise tenant 302 to possess direct, unlimited, and secure access to the transformed data.

In various embodiments, enterprise data warehouse 110 may be a centralized repository for a given enterprise where large volumes of data are stored. Enterprise analytics machine learning models and other enterprise business intelligence tools may utilize the data stored in enterprise data warehouse 110 for model training and analytics purposes.

In the depicted embodiment, enterprise insights data set transformation apparatus 112 extracts enterprise insights data set 306 from external software platform 108. The extraction may involve API calls, database queries, or reading from the external software platform's 108 file system. Enterprise insights data set transformation apparatus 112 is configured to transform and restructure enterprise insights data set 306 via transformation process 308. The restructured enterprise insights data set generated by enterprise insights data set transformation apparatus 112 via transformation process 308 is configured to enable improved processing and analysis by enterprise analytics machine learning models.

In the depicted embodiment, transformation process 308 begins by analyzing the schema and structure of the enterprise insights data set 306 to identify nested and hierarchical relationships between data points. Next, transformation process 308 employs a flattening algorithm to transform nested and hierarchical data into a flattened structure. Data manipulation techniques such as denormalization or pivot operations may be used in addition to custom flattening logic. An example transformation to a flattened structure is illustrated by and described with reference to FIG. 6 below.

In the depicted embodiment, transformation process 308 continues by converting any necessary static and dynamic data types to data types compatible with a target columnar file format (e.g., Parquet). Next, transformation process 308 generates metadata which describes the structure of the transformed data, including column names, data types, relevant statistics, timestamp information, soft delete flags, data identifiers, and/or the like. Transformation process 308 then optimizes the transformed data for improved query performance. Optimization techniques may include reordering columns based on expected query patterns, indexing, caching, partitioning, and/or the like. Transformation process 308 then performs data compression techniques suitable for columnar data such as dictionary encoding, bit packing, run-length encoding, and/or the like.

It is to be appreciated that the steps of transformation process 308 described above may be performed in any order and may omit steps or include additional steps.

In the depicted embodiment, the restructured enterprise insights data set is stored in transformed data storage 114 to await generation of full or delta transformed data export data sets and exportation to enterprise data warehouse 110 by export process 310.

The restructured enterprise insights data set enables improved processing and analysis by enterprise analytics machine learning models in many ways. The flattened structure allows for more efficient querying, especially for analytics workloads that typically access a subset of columns. Data optimizations such as column reordering further enhance the querying process. Many machine learning algorithms are designed to work best with tabular data. The flattened structure is more directly usable for such algorithms. Columnar data structures often achieve better results from data compression techniques, further improving storage efficiency and reducing storage costs. The restructured enterprise insights data set is also easily partitionable, enabling better distribution of processing workloads and increasing scalability.

Referring now to export process 310, the enterprise insights data export apparatus 120 is configured to export the restructured enterprise insights data set stored in transformed data storage 114 to enterprise data warehouse 110. The depicted export process 310 utilizes a two-tiered export approach by generating both full and delta transformed data export data sets as discussed in detail below.

In the depicted embodiment, enterprise insights data export apparatus 120 performs a full export via export process 310. This process involves generating a full transformed data export data set based on the restructured enterprise insights data set or the enterprise insights data set 306. A full transformed data export data set represents a snapshot of the entire enterprise insights data set 306 at a specific point in time. Full transformed data exports typically occur at a predefined low-traffic time slot (e.g., outside of normal business hours, in the middle of the night, on holidays, etc.).

The full transformed data export data set serves as a baseline for subsequent delta transformed data export data sets. It provides a complete snapshot of an enterprise tenant's data, which can be used for initial population of enterprise data warehouse 110, data warehouse loads, or as a recovery point in case of synchronization issues or data loss event.

In the depicted embodiment, enterprise insights data export apparatus 120 generates a full transformed data export data set. This process involves extracting all data included in the enterprise insights data set 306 or the restructured enterprise insights data set stored in transformed data storage 114. Enterprise insights data export apparatus 120 generates metadata relating to the contents of the full transformed data export data set, and/or the type of data it includes. Enterprise insights data export apparatus 120 also performs data compression. Enterprise insights data export apparatus 120 stores the full transformed data export data set in export data storage 124 to await exportation to enterprise data warehouse 110. Enterprise insights data export apparatus 120 then transmits the full transformed data export data set to an available location of an enterprise data warehouse 110 associated with enterprise tenant 302.

Upon successful completion of the full export, enterprise insights data export apparatus 120 triggers enterprise insights data export system 106 to generate and transmit an export success notification 312 to the client device 102 associated with the enterprise tenant 302. In alternative embodiments, enterprise insights data export apparatus 120 may cause generation of export success notification 312 by enterprise data warehouse 110 and cause transmission of export success notification 312 from enterprise data warehouse 110 to the client device 102 associated with enterprise tenant 302.

Export success notification 312 may be configured to notify the enterprise tenant 302 of successful completion of a full export to the enterprise data warehouse 110 and provide a location of the enterprise data warehouse 110 where the full transformed data export data set is stored, such as a clickable link, a file path directory, a reference address, and/or the like. Export success notification 312 may be embodied by an email, text message, push notification, and/or the like.

In various embodiments, enterprise insights data export apparatus 120 performs a delta export via export process 310. This process may involve generating a delta transformed data export data set based the restructured enterprise insights data set or the enterprise insights data set 306. A delta transformed data export data set comprises only portions of the enterprise insights data set 306 or the restructured enterprise insights data set that have been altered since a previous full export or a previous delta export. This approach minimizes the amount of data being transmitted and allows enterprises to update their enterprise data warehouse 110 without needing to perform a full export (i.e., at a reduced network data transmission load or under a reduced computational expense).

Delta exports may be performed automatically at predefined internals (e.g., hourly, etc.) or at customer defined time slots, allowing for flexible scheduling that aligns with an enterprise's specific data refresh requirements. An enterprise may also initiate a non-scheduled delta export via a request to enterprise insights data export system 106. This allows an enterprise to obtain real-time access to their data and efficiently synchronize large datasets at any time, regardless of the limitations possibly imposed by data export policies or predefined data export schedules.

In various embodiments, enterprise insights data export apparatus 120 generates a delta transformed data export data set via export process 310. This process may include performing Change Data Capture (CDC) techniques. CDC techniques such timestamp-based detection, log-based CDC, or trigger-based CDC may be utilized to identify which data points have been altered since the previous export. Then, only the altered data is extracted from the enterprise insights data set 306 or the restructured enterprise insights data set.

Enterprise insights data export apparatus 120 may generate metadata relating to the contents of the delta transformed data export data set, the time range it covers, and/or the type of data it includes. This enables the enterprise data warehouse 110 to easily incorporate the updated data into its corpus. Enterprise insights data export apparatus 120 may also perform data compression.

Enterprise insights data export apparatus 120 may store the delta transformed data export data object in export data storage 124 to await exportation to enterprise data warehouse 110. Enterprise insights data export apparatus 120 may then transmit the delta transformed data export data set to an available location of an enterprise data warehouse 110 associated with enterprise tenant 302.

Upon successful completion of the delta export, the depicted enterprise insights data export apparatus 120 is configured to trigger enterprise insights data export system 106 to generate and transmit an export success notification 312 to the client device 102 associated with the enterprise tenant 302. In alternative embodiments, enterprise insights data export apparatus 120 may cause generation of export success notification 312 by enterprise data warehouse 110 and cause transmission of export success notification 312 from enterprise data warehouse 110 to the client device 102 associated with enterprise tenant 302.

Export success notification 312 may be configured to notify the enterprise tenant 302 of successful completion of a delta export to the enterprise data warehouse 110 and provide a location of the enterprise data warehouse 110 where the delta transformed data export data set is stored, such as a clickable link, a file path directory, a reference address, and/or the like. Export success notification 312 may be embodied by an email, text message, push notification, and/or the like.

In addition to an export success notification, notification 312 may also embody a delta transformed data export data set notification. Enterprise insights data export system 106 may also be configured to receive updated or altered data associated with enterprise insights data set 306 from external software platform 108 and automatically generate a delta transformed data export data set. Upon generation of the delta transformed data export data set, enterprise insights data export system 106 may generate and transmit a delta transformed data export data set notification that is configured to notify the enterprise tenant 302 (e.g., an admin user of an enterprise) that a delta transformed data export data set is stored in export data storage 124 and ready to be exported to enterprise data warehouse 110. Delta transformed data export data set notification may be embodied by an email, text message, push notification, external software platform interface object, and/or the like.

Delta transformed data export data set notification may also be configured to enable enterprise tenant 302 to initiate transmission of the delta transformed data export data set to enterprise data warehouse 110.

Referring now to FIG. 4, and example process 400 is illustrated for monitoring and generating alerts relating to transformation process 308 and export process 310 in accordance with one or more embodiments of the present disclosure.

Due to the large scale of data being processed by enterprise insights data export system 106, there is a need for monitoring the system for errors and generating alerts so that the errors may be addressed. Errors may arise from network glitches while reading or writing data to a data repository, system operation timeouts, bitwise failures, data duplication, and/or the like. Alerts notify the administrator of the system of failures and allow the failures to be addressed quickly and efficiently.

At operation 402, transformation process 308 is executed.

At operation 404, a determination is made if any errors occurred during transformation process 308. If an error occurred, example process 400 moves to operation 406, where an appropriate alert is generated. In some embodiments, example process 400 moves back to operation 402 to reattempt transformation process 308.

If transformation process 308 was successful, example process 400 moves to operation 408. At operation 408, export process 310 is performed.

At operation 410, a determination is made if any errors occurred during export process 310. If an error occurred, example process 400 moves to operation 412, where an appropriate alert is generated. In some embodiments, example process 400 moves back to operation 410 to reattempt export process 310.

If export process 310 was successful, example process 400 moves to operation 414. At operation 414, an export success notification is generated by enterprise insights data export system 106 as described above with reference to FIG. 3. In the depicted embodiment, export process 310 causes generation of export success notification 312 by enterprise data warehouse 110.

At operation 416, enterprise insights data export system 106 transmits the export success notification to a client device 102 associated with an appropriate enterprise tenant 302. In the depicted embodiment, export process 310 causes transmission of export success notification 312 from enterprise data warehouse 110 to client device 102.

Referring now to FIG. 5, an example process 500 for performing export process 310 is illustrated in accordance with one or more embodiment of the present disclosure.

At operation 502, a determination is made as to whether the threshold requirements for performing a full export are met. An example of meeting the threshold requirements include a timestamp being within a predetermined low-traffic time slot. If the threshold requirements are met, example process 500 moves to operation 504. If the threshold requirements are not met, example process 500 moves to operation 506.

At operation 504, a full transformed data export data set is generated as described with reference to FIG. 3 above.

At operation 506, a delta transformed data export data set is generated as described with reference to FIG. 3 above.

At operation 508, enterprise insights data export system 106 determines an appropriate location of export data storage 124 for the generated transformed data export data set to be stored based on metadata associated with the generated transformed data export data set.

At operation 510, the generated transformed data export data set is exported from enterprise insights data export system 106 to a selected location of a selected enterprise data warehouse 110. For example, a given enterprise data warehouse 110 may be selected based on the metadata indicating that the generated transformed data export data set is associated with a given enterprise tenant 302. As another example, a location within the selected enterprise data warehouse 110 may be selected based on a file size described by the metadata.

FIG. 6 illustrates an example transformation of a non-flattened data structure to a flattened data structure. Non-flattened data structure 602 is comprised of nine data points arranged in three entities labeled 602A, 602B, and 602C. In various embodiments, transformation process 308 transforms non-flattened data structure 602 into flattened data structure 604. In flattened data structure 604, the nine data points are arranged linearly based on a row label. All data points of entity 602A (A1, A2, and A3) are stored before the data points of entity 602B (B1, B2, and B3) which are stored before the data points of entity 602C (C1, C2, and C3).

Flattened data structure 604 is configured to address the technical difficulty of efficiently querying and processing nested, hierarchical, multi-dimensional data structures. This structure enables accelerated analytic querying and is optimized for training enterprise analytics machine learning models.

FIG. 7 is a flowchart diagram of an example process 700 for generating and exporting full and delta transformed data export data sets via an enterprise insights data export system to an enterprise data warehouse based on an enterprise insights data set accessed from a selected enterprise tenant of an external software platform in accordance with one or more embodiments of the present disclosure.

At operation 702, an enterprise insights data export system 106 accesses an enterprise insights data set 306 from a selected enterprise tenant 302 of an external software platform 108.

At operation 704, export process 310 of enterprise insights data export system 106 generates a full transformed data export data set based on the enterprise insights data export data set 306. In some embodiments, the full transformed data export data set is temporarily stored in export data storage 124.

At operation 706, export process 310 of enterprise insights data export system 106 transmits the full transformed data export data set from export data storage 124 to an enterprise data warehouse 110 at a predefined low-traffic time slot.

At operation 708, export process 310 of enterprise insights data export system 106 generates a delta transformed data export data set based on the enterprise insights data export data set 306 and a previous full transformed data export data set or a previous delta transformed data export data set. In some embodiments, the delta transformed data export data set is temporarily stored in export data storage 124.

At operation 706, export process 310 of enterprise insights data export system 106 transmits the delta transformed data export data set from export data storage 124 to an enterprise data warehouse 110 at a delta time slot which differs from the predetermined low-traffic time slot.

In various embodiments, in response to successful completion of transmission of the full transformed data export data set and/or the delta transformed data export data set, enterprise insights data export system 106 may be configured to generate and transmit an export success notification to a client device associated with the selected enterprise tenant 302.

In various embodiments, upon successful generation of the delta transformed data export data set, enterprise insights data export system 106 may be configured to generate and transmit a delta transformed data export data set notification to a client device associated with the selected enterprise tenant 302 before proceeding with the transmission of the delta transformed data export data set to the enterprise data warehouse.

FIG. 8 is a flowchart diagram of an example process 800 for generating a restructured enterprise insights data set by transforming an enterprise insights data set via an enterprise insights data set transformation apparatus in accordance with one or more embodiments of the present disclosure.

At operation 802, an enterprise insights data set transformation apparatus 112 accesses an enterprise insights data set 306 from a selected enterprise tenant 302 of an external software platform 108.

At operation 804, the enterprise insights data set transformation apparatus 112 transforms the enterprise insights data set 306 to define a columnar structure thereby generating a restructured enterprise insights data set.

At operation 806, the restructured enterprise insights data set is stored within an enterprise data warehouse 110 associated with the selected enterprise tenant 302. In various embodiments, the restructured enterprise insights data set is configured for training one or more enterprise analytics machine learning models.

In various embodiments, the enterprise insights data set includes deleted data comprises a deleted designation, such as a soft delete flag.

In various embodiments, the enterprise insights data set is transformed to no longer define nested, hierarchical, or multi-dimensional data.

In various embodiments, the enterprise insights data set is transformed to comply with a parquet file format.

In various embodiments, the restructured enterprise insights data set comprises metadata configured to enable accelerated analytic querying of the restructured enterprise insights data, wherein the metadata comprises self-describing column labels.

In various embodiments, the transformed enterprise insights data set is compressed via dictionary encoding methods, bit packing methods, or run length encoding methods.

In various embodiments, the enterprise insights data set transformation apparatus 112 may be configured to generate, in response to the enterprise insights data being larger than a predefined size threshold, a plurality of restructured enterprise insights data sets, wherein each restructured enterprise insights data set comprises a set identifier.

It should be readily appreciated that the embodiments of the systems and apparatuses, described herein may be configured in various additional and alternative manners in addition to those expressly described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. An enterprise insights data export apparatus configured to export an enterprise insights data set from an external software platform to an enterprise data warehouse, the enterprise insights data export apparatus comprising one or more processors and one or more memories storing instructions that are operable, when executed by the one or more processors, to cause the enterprise insights data export apparatus to:

- access the enterprise insights data set from a selected enterprise tenant of the external software platform;
- generate a full transformed data export data set based on the enterprise insights data set;
- transmit the full transformed data export data set to the enterprise data warehouse at a predefined low-traffic time slot;
- generate a delta transformed data export data set based on the enterprise insights data set and on a previous full transformed data export data set or a previous delta transformed data export data set; and
- transmit the delta transformed data export data set to the enterprise data warehouse at a delta time slot, wherein the delta time slot differs from the predefined low-traffic time slot.

2. The enterprise insights data export apparatus of claim 1, wherein the full transformed data export data set is generated during a full export.

3. The enterprise insights data export apparatus of claim 1, wherein the delta transformed data export data set is generated during a delta export.

4. The enterprise insights data export apparatus of claim 1, wherein the enterprise insights data set is transformed to a flattened data structure.

5. The enterprise insights data export apparatus of claim 1, wherein the one or more processors and one or more memories storing instructions are further operable, when executed by the one or more processors, to cause the enterprise insights data export apparatus to:

- cause, in response to successful completion of transmission of the enterprise insights data set to the enterprise data warehouse, generation of an export success notification, wherein the export success notification comprises at least a location of the enterprise data warehouse where the enterprise insights data set is stored; and
- cause transmission, to a customer device associated with the selected enterprise tenant, of the export success notification.

6. The enterprise insights data export apparatus of claim 1, wherein the enterprise data warehouse is configured to be directly accessible by a client device.

7. The enterprise insights data export apparatus of claim 1, wherein the delta transformed data export data set comprises only enterprise insights data altered since a previous full export or a previous delta export.

8. The enterprise insights data export apparatus of claim 1, wherein the one or more processors and one or more memories storing instructions are further operable, when executed by the one or more processors, to cause the enterprise insights data export apparatus to:

- cause, prior to generating the delta transformed data export data set, generation of a delta transformed data export data set notification, wherein the delta transformed data export data set notification comprises an indication that the delta transformed data export data set is ready to be exported; and
- cause transmission, to a client device associated with the selected enterprise tenant, of the delta transformed data export data set notification.

9. A computer program product, the computer program product comprising at least one non-transitory computer-readable storage medium having computer-readable program code portions stored therein, the computer-readable program code portions configured to:

- access an enterprise insights data set from a selected enterprise tenant of an external software platform;
- generate a full transformed data export data set based on the enterprise insights data set;
- transmit the full transformed data export data set to an enterprise data warehouse at a predefined low-traffic time slot;
- generate a delta transformed data export data set based on the enterprise insights data set and on a previous full transformed data export data set or a previous delta transformed data export data set; and
- transmit the delta transformed data export data set to the enterprise data warehouse at a delta time slot, wherein the delta time slot differs from the predefined low-traffic time slot.

10. The computer program product of claim 9, wherein the full transformed data export data set is generated during a full export.

11. The computer program product of claim 9, wherein the delta transformed data export data set is generated during a delta export.

12. The computer program product of claim 9, wherein the enterprise insights data set is transformed to a flattened data structure.

13. The computer program product of claim 9, wherein the computer-readable program code portions are further configured to:

cause, in response to successful completion of transmission of the enterprise insights data set to the enterprise data warehouse, generation of an export success notification, wherein the export success notification comprises at least a location of the enterprise data warehouse where the enterprise insights data set is stored; and cause transmission, to a customer device associated with the selected enterprise tenant, of the export success notification.

14. The computer program product of claim 9, wherein the enterprise data warehouse is configured to be directly accessible by a client device.

15. The computer program product of claim 9, wherein the delta transformed data export data set comprises only enterprise insights data altered since a previous full export or a previous delta export.

16. The computer program product of claim 9, wherein the computer-readable program code portions are further configured to:

cause, prior to generating the delta transformed data export data set, generation of a delta transformed data export data set notification, wherein the delta transformed data export data set notification comprises an indication that the delta transformed data export data set is ready to be exported; and cause transmission, to a client device associated with the selected enterprise tenant, of the delta transformed data export data set notification.

17. A computer-implemented method comprising:

accessing an enterprise insights data set from a selected enterprise tenant of an external software platform;

generating a full transformed data export data set based on the enterprise insights data set;

transmitting the full transformed data export data set to an enterprise data warehouse at a predefined low-traffic time slot;

generating a delta transformed data export data set based on the enterprise insights data set and on a previous full transformed data export data set or a previous delta transformed data export data set; and transmitting the delta transformed data export data set to the enterprise data warehouse at a delta time slot, wherein the delta time slot differs from the predefined low-traffic time slot.

18. The computer-implemented method of claim 17, wherein the enterprise insights data set is transformed to a flattened data structure.

19. The computer-implemented method of claim 17, further comprising:

causing, in response to successful completion of transmission of the enterprise insights data set to the enterprise data warehouse, generation of an export success notification, wherein the export success notification comprises at least a location of the enterprise data warehouse where the enterprise insights data set is stored; and causing transmission, to a customer device associated with the selected enterprise tenant, of the export success notification.

20. The computer-implemented method of claim 17, further comprising:

causing, prior to generating the delta transformed data export data set, generation of a delta transformed data export data set notification, wherein the delta transformed data export data set notification comprises an indication that the delta transformed data export data set is ready to be exported; and causing transmission, to a client device associated with the selected enterprise tenant, of the delta transformed data export data set notification.

* * * * *